United States Patent [19]
Axen et al.

[11] 3,847,745
[45] Nov. 12, 1974

[54] PREPARATION OF WATER-INSOLUBLE BIOLOGICALLY ACTIVE MATERIALS

[75] Inventors: Rolf Axen, Upplands Ballinge; Per Vretblad; Jerker Olof Porath, both of Uppsala, all of Sweden

[73] Assignee: Exploaterings Aktiebolaget T.B.F., Uppsala, Sweden

[22] Filed: Mar. 20, 1973

[21] Appl. No.: 343,183

Related U.S. Application Data

[63] Continuation of Ser. No. 98,027, Dec. 14, 1970, abandoned.

[30] Foreign Application Priority Data
Dec. 18, 1969  Sweden.............................. 17508/69
Apr. 8, 1970  Sweden.............................. 4781/70

[52] U.S. Cl............... 195/68, 195/63, 195/DIG. 11, 260/112 R

[51] Int. Cl............................................. C07g 7/02
[58] Field of Search................ 195/63, 68, DIG. 11; 260/112 R; 98/27

[56] References Cited
UNITED STATES PATENTS
3,645,852   2/1972   Axen et al. ........................... 195/68

*Primary Examiner*—David M. Naff
*Attorney, Agent, or Firm*—Young & Thompson

[57] ABSTRACT

Biologically active materials such as enzymes and hormones are coupled by an isonitrile group-containing compound to insoluble organic, hydrophilic polymeric carriers.

3 Claims, No Drawings

PREPARATION OF WATER-INSOLUBLE BIOLOGICALLY ACTIVE MATERIALS

This is a continuation of application Ser. No. 98,027, filed Dec. 14, 1970, now abandoned.

The chemical methods for coupling biologically important molecules to water-insoluble, polymeric carriers have received ever increasing interest in recent years. The synthesized products are suitable for studies of physical and chemical interactions between the coupled molecule and its complementary molecule. Insoluble biological activities and affinities can also be handled, controlled and reacted more easily and are thereby utilized significantly better.

A large number of organochemical processes have been developed to produce derivatives of peptides and proteins on insoluble carriers. Several of these processes result in products with acceptable activities and affinities, but the methods are often complicated and too harsh for the matrix portion. Therefore, the physicomechanical properties of the conjugate system are often unsuitable for use in e.g., bed reactors. Despite this, however, synthesized products have found use in biochemical and medical research laboratories and to a certain extent even for routine clinical analysis. Certain products, solid enzymes, have also been made the object of industrial production and an increased use of the solid enzymes in industrial production methods has resulted in greater possibilities for development.

The background work behind the invention has been aimed at the covalent coupling of proteins to polysaccharide polymers in particular. Practicable, water-insoluble enzyme derivatives have been synthesized, partly by means of a process involving isothiocyanate structures and partly with a process involving activation of the matrix with cyanogen halides. The specific adsorption produced corresponds to the demands made for both analytical and preparative purposes.

The following demands have been set for working out the coupling reactions for proteins and the rest of the biologically active molecules.

1. A number of chromatographic separation media are now available for classic biochemical separations (carboxymethyl cellulose, agarose, particles and cross-linked dextran), and these are equipped with suitable general and special mechanical and physical properties for work with biological systems. It is essential to be able to use them in the form of packed beds. Since a great deal of information about the chromatographic properties of biological substances in similar beds has been collected, a superimposition of specific biological activity of affinity to just such matrices is therefore particularly desirable. When the polymeric carrier contains suitable functional groups, some of them are used for coupling; but otherwise such groups must be introduced by mild reactions. Extensive cross-linking and the introduction of large amounts of protonizable groups should be avoided.

2. The coupling method must include reactions which occur quickly in aqueous solution under mild conditions so that the biological activity is not considerably impaired; and normally no changes in the specificity are desirable.

The previously mentioned cyanogen halide method essentially fulfills the demands made. However, the coupling of protein occurs with very low yield when the pH value during coupling is below 7, and the coupling takes place via amino groups. However, coupling of biologically important molecules via functional groups other than amino groups is often necessary since not all biologically active substances contain amino groups. In particular coupling via carboxyl anions is of great interest.

The present invention relates to a method of preparing polymer products having a molecular weight over 1,000, especially adsorption material and polymer-bridged ("solid," "insoluble") enzymes by covalent coupling of two or more substances, whereby at least one is a polymer acting as a carrier, the carrier polymer, and is characterized in that each of the above mentioned substances contains at least one of the following functional groups: isonitrile, aldehyde or ketone, anion, primary or secondary amines, and that the reaction occurs in a reaction mixture containing these cited substances, possibly supplemented with additional substances so that all the functional groups in question are simultaneously present at the beginning of the reaction.

The invention is based on the tendency for isonitriles to undergo the α-addition of suitable pairs of functional groups. The functional groups can also be chosen so that the addition product is transposed to a stable chemical structure. Substances containing such functional groups can thus be coupled together via isonitriles to stable conjugates. At least one reaction structure can be chosen for the polymeric carrier. A possible and known reaction variant involving isonitriles is Ugi's reaction which primarily involves a so-called α-addition of an immonium ion and an anion to an isonitrile, and secondarily a conversion reaction to a stable final product.

Ugi's reaction with aldehyde will thus be:

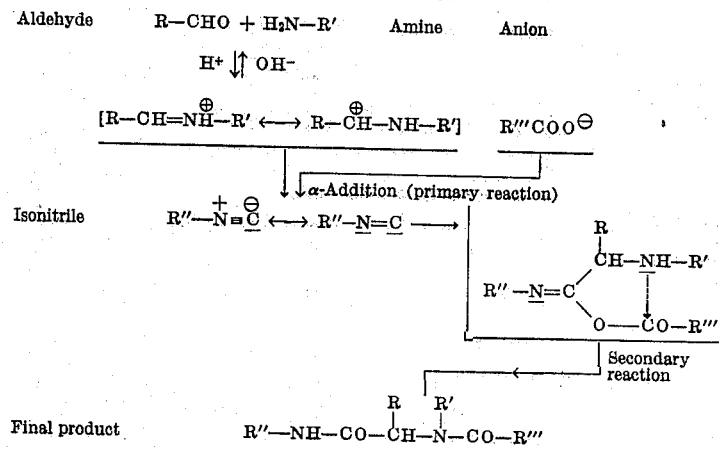

With Ketone, Ugi's reaction will be:

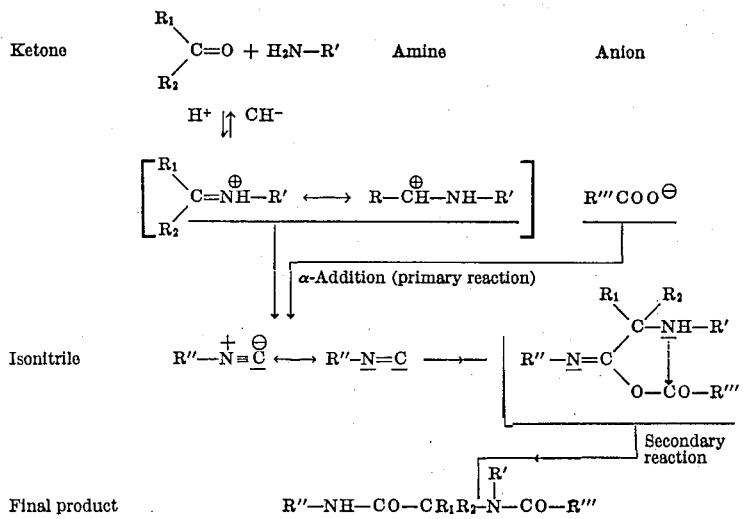

In e.g., a process according to the invention, the following applies for the reactants: (1) The aldehyde- and ketone group, respectively, is obtained from aldehyde respectively ketone in the reaction solution, or from insoluble aldehyde-respectively ketone-containing polymer; (2) The immonium ion is obtained after reaction of an amino group in a peptide or protein or an amino group from an amino polymer with the aldehyde-respectively ketone function according to the above; (3) The anion, preferably carboxylate ion, is obtained from protein or carboxylate polymers. In this example, the structure of the stable final product obtained from Ugi's reaction has the formula —NH—CO—CH(-R)—NR'-, or the formula —NH—CO—CR$_1$R$_2$—NR'-. The secondary transformation reaction results in stable peptide configuration from complex protolytic equilibria and makes the reaction applicable.

Thus, the process works with four functional groups, —NH$_2$, CHO or >C=O, —COO$^-$ and —NC. The protein normally contains amino- and carboxyl groups. The polymer is selected and can thus be provided with —NH$_2$, CHO or >C=O, —COO$^-$ or —NC functions, or two or more of these functions. Amino polymers, aldehyde polymers and carboxyl polymers have been carefully researched and syntheses of isonitrile polymers have been shown to given promising results.

As examples of some of the possibilities where the Ugi reaction is used for the chemical coupling of protein to insoluble carriers, several results are given in the table where chymotrypsin is coupled to a series of different polymers using dimethylamine-propyl-isonitrile as fixing agent.

Examples

The coupling of Chymotrypsin to Different Polymer Carriers

Example 1A. Coupling to aldehyde Polymer. Varying amounts of chymotrypsin are chemically coupled by isonitrile to a series of different polymers. Different amounts of isonitrile and acetaldehyde are added to the reacting suspension of 50 mg polymer and 2 ml water. The acetaldehyde was removed when the coupling to the aldehyde polymer occurred. Fixing was done at pH 6.5 with the help of a pH meter.

The catalytic activity was determined with a 10 mM solution of N-acetyl-L- tyrosine ethyl ester and with casein, and the values are given in the table.

The amount of fixed enzyme is determined by amino acid analysis. The resulting catalytic activity of the products with acetyl-L-tyrosine ethyl ester is measured in a pH meter at the apparent pH optimum of the product. The activity is also compared with the activity of a corresponding amount of free enzyme at its pH optimum. The relationship obtained is called the relative activity and is expressed as a percentage. Normally, optimum displacement of the enzyme activity depends on the accumulation at the ester hydrolysis of freely formed protons in the matrix skeleton. The experimental conditions for the coupling reaction are quite mild as shown in the table.

The polymeric carriers used are obtained in the following way: CM-Sephadex is a commercial product from Pharmacia Fine Chemicals, Uppsala and consists of epichlorohydrin- cross linked dextran substituted with carboxy methyl groups. CM-aragose has been synthesized by treating 4 percent agarose gel with chloroacetic acid.

Agarose-lysine-ethyl ester has been synthesized by treating 4 percent agarose with cyanogen bromide at pH 11 and then fixing lysine-ethyl ester in 0.5-M sodium bicarbonate solution.

Amino ethyl polyacrylamide is obtained by treating crosslinked polyacrylamide with ethylene diamine. 1 g polyacrylamide is converted into a derivative with 15 ml ethylene amine for 3 minutes at 90°C. The product is washed with a 0.1 M common salt solution. The cross-linked polyacrylamide used was purchased from Bio-Rad Lab. Richmond, Calif. (Biogel P300).

Enzacryl AA is a cross-linked polyacrylamide polymer substituted with aromatic amino groups. It is marketed by Koch-Light Lab. Ltd., Colnbrook, Buckinghamshire, England.

Aldehyde-agarose is obtained by periodate oxidation at pH 3 with 0.05 M or at pH 5 with 0.1 M periodate. Sepharose 4 B purchased from Pharmacia Fine Chemicals, Uppsala, is used as agarose gel.

Polymethyl methacrylate ("plexiglass") in the form of filings is partially hydrolyzed with 2 N caustic soda for 24 hours at 50°C and is then washed with 10$^{-3}$M hydrochloric acid.

Sheep wool is washed with acetone and 1 N caustic soda. Example 1 B. Coupling to Keto-polymer. Epichlorohydrin-cross linked agarose is oxidated with a mixture consisting of 12 ml dimethyl sulphoxide and 5 ml acetic acid anhydride at 40°C for 90 minutes. After it has been washed on a glass filter with acetone, the polymer is treated with 15 ml hydrochloric acid (0.4 M) at 35°C for 2 hours. The final washing is done on a glass filter with water.

50 mg of the thereby obtained keto group-containing polymer was reacted with 15 mg chymotrypsin and 10μl 3-dimethyl amino propyl isonitrile at pH 6.5 for 6 hours at room temperature. After extensive washing, the product obtained was found to contain 40 mg chymotrypsin per g polymer conjugate. The relative activity of the coupled enzyme to N-acetyl-L-tyrosin ethyl ester in a 15 mM solution was determined to be analogous with the above, and was found to be 46 percent of the activity of the free enzyme and 40 percent of the activity with casein. Example 2 A. Coupling of cortisone to CM-Sepahdex Cortisone is a keto group containing steroid with hormone properties.

CM-Sephadex (carboxy methyl substituted, cross-linked dextran) from Pharmacia Fine Chem., Uppsala, is suspended in a mixture consisting of 0.25 ml ethanol and 1.75 ml water; 25μl 3-dimethyl amino propyl isonitrile and 20 μl butyl amine are added, followed thereafter by the addition of 10 mg cortisone. The reaction time is 24 hours at pH 6.5 and at room temperature.

A swelling amount of gel, corresponding approx. to 1 g dry weight, is reacted with 10 mg oxytocin in 0.1 M sodium azide solution at pH 6.5. After careful washing the degree of substitution of the oxytocin is found to be 3 mg per g conjugate.

The new polymeric material according to the present invention has great advantages over previously known polymeric material used for the same purposes. Because of the specific coupling of the functional groups, they can be placed in exact positions in the matrix instead of the often non-uniform dispersion obtained by coupling the groups one by one. This results in a significantly more even separation activity. In addition, because of the cross-linked structure, the matrix can be used for liquid as well as hard, solid materials, and intermediate states. It is also possible, of course, to work with water-soluble carriers dissolved in water or other substances.

The polymer material according to the invention has shown itself to be very effective for enzymatic reactions in beds and suspensions, and for separating different biochemically active substances, such as enzymes, hormones, inhibitors or stimulators of metabolic processes.

TABLE

Chymotrypsin fixed to a series of polymeric carriers with isonitrile. Catalytic properties of the conjugate

| Carrier | Functional carrier group | Mg. Chy in reaction mixture to 50 mg. carrier | Amount of isonitrile plus additional reagent, μl. plus μl. | Reaction time | Amount of fixed Chy in mg./g. conjugate | Activity, mol | |
|---|---|---|---|---|---|---|---|
| | | | | | | ATEE | Casein |
| CM-Sephadex C-50® | —OCH$_2$—COOH | 5 | 25 plus acetaldehyde 25 | 1 | 55 | 13 | 0 |
| Do | —OCH$_2$—COOH | 20 | do | 1 | 175 | 10 | 0 |
| Do | —OCH$_2$—COOH | 35 | do | 6 | 345 | 7 | 0 |
| Do | —OCH$_2$—COOH | 50 | 125 plus acetaldehyde 125 | 1 | 395 | 5 | 0 |
| CM-Agarose | —OCH$_2$—COOH | 35 | 25 plus acetaldehyde 25 | 1 | 60 | 10 | 0 |
| Polymethyl methacrylate (partially hydrolized) | —COOH | 10 | 25 plus acetaldehyde | 6 | | ($^1$) | 0 |
| Cross-linked amino ethyl-polyacryl-amide | Alif. —NH$_2$ | 8 | 25 plus acetaldehyde 25 | 6 | 45 | 10 | 5 |
| Enzacryl AA® | Arom. —NH$_2$ | 35 | do | 6 | 135 | 25 | 2-3 |
| Agarose-lysin ethyl ester | Alif. —NH$_2$ | 20 | do | 6 | 15 | 50 | 20 |
| Periodate-oxidized Sepharose 4B® (oxide at pH 3) | >C=O | 25 | 25 | 6 | 6 | 60 | 40 |
| Periodate-oxidized Sepharose 4B® (oxide at pH 5) | >C=O | 35 | 25 | 6 | 17 | 80-90 | 40-60 |
| Epichlorohydrin cross-linked agarose oxidized with dimethyl sulphoxide plus acetic acid anhydride | >C=O | 15 | 10 | 6 | 40 | 46 | 45 |
| Sheep wool | —NH$_2$ and —COOH | 35 | 25 plus acetaldehyde 25 | 6 | | ($^2$) | |

$^1$ 0.8 μmol/min./mg.  $^2$ 10 μmol/min./mg.

After extensive washing, a product is obtained which contains 15 mg cortisone per g polymer conjugate. Example 2 B. Coupling of cortisone to Enzacryl. Enzacryl is an amino polymer of cross-linked polyacrylamide for Koch-Light Laboratories, Colnbrook, Buckinghamshire, England.

50 mg Enzacryl is suspended in a mixture of 1 ml ethanol and 1 ml water. 25 μl 3-dimethyl amino propyl isonitrile and 75 mg sodium acetate are added, followed by the addition of 10 mg cortisone. The mixture was allowed to react for 24 hours at pH 6.5 and at room temperature. After extensive washing, a product was obtained which contained 15 mg cortisone per g polymer conjugate. Example 3. Isonitrile coupling of peptide in the presence of sodium azide. A particulate and reducing gel is obtained by polymerization of a mixture of acrylamide, N, N'-methylene bis-acrylamide and acrolein, decomposition of the gel mass formed by forcing it through a finely meshed screen, and subsequent washing.

What we claim is:

1. A method of preparing a water-insoluble biologically active polymeric material which comprises admixing in an aqueous medium at least three substances of which at least one is an insoluble organic, hydrophilic polymer and at least one other is a biologically active water-soluble organic substance and a third is an isonitrile group-containing compound, said biologically active water-soluble organic substance being selected from the group consisting of enzymes and hormones, said polymer being selected from the group consisting of cross-linked dextran, agarose, polyacrylamide, polymethylmethacrylate, and derivatives thereof, at least one of said at least three substances containing an anion, at least one of said at least three substances containing a primary or secondary amino group, at least one of said at least three substances other than said water-soluble organic substance containing aldehyde or ketone, reacting said at least three substances to form a said water-insoluble polymeric material wherein said water-soluble organic substance is coupled to said polymer by said isonitrile group-containing compound, and separating said water-insoluble polymeric material from the aqueous medium.

2. A method according to claim 1 in which said anion is a carboxylate anion.

3. A method according to claim 1 in which said isonitrile group-containing compound is dimethylaminopropyl isonitrile.

* * * * *